(12) United States Patent  (10) Patent No.: US 8,567,966 B2
Hubbs  (45) Date of Patent: Oct. 29, 2013

(54) UNIVERSAL SPHERE MOUNT

(75) Inventor: William O. Hubbs, Cedar Hill, MO (US)

(73) Assignee: Hubbs Machine & Manufacturing, Inc., Cedar Hills, MO (US)

( * ) Notice: Subject to any disclaimer, the term of this patent is extended or adjusted under 35 U.S.C. 154(b) by 303 days.

(21) Appl. No.: 12/930,425

(22) Filed: Jan. 6, 2011

(65) Prior Publication Data

US 2012/0038994 A1    Feb. 16, 2012

Related U.S. Application Data

(60) Provisional application No. 61/336,520, filed on Jan. 22, 2010.

(51) Int. Cl.
*G02B 5/132* (2006.01)

(52) U.S. Cl.
USPC .......................................... 359/543; 359/836

(58) Field of Classification Search
USPC .................. 359/529–530, 534–543, 834, 837
See application file for complete search history.

(56) References Cited

U.S. PATENT DOCUMENTS

| | | | |
|---|---|---|---|
| 5,861,956 A | 1/1999 | Bridges et al. |
| 6,299,122 B1 | 10/2001 | Bame |
| 6,765,733 B1 | 7/2004 | Igl et al. |
| 7,110,194 B2 | 9/2006 | Hubbs |
| 7,204,024 B2 | 4/2007 | Hubbs |

*Primary Examiner* — James Phan
(74) *Attorney, Agent, or Firm* — Paul M. Denk

(57) ABSTRACT

The universal sphere mount provides a spherically mounted retro-reflector conical nest mount having a base, a body of lesser diameter than the base, and a precise nest in the body that receives a retro-reflector target. The body steps inwardly from the base or has bevel. The body has a lesser diameter than the base so the reflector achieves an orientation below a horizontal plane at any horizontal rotation upon the body. The nest receives a spherically mounted retro-reflector and positions it with high precision over the shank. The nest has at least three oblique clearance areas, equally spaced, that permit a maximum negative acceptance angle for incident light to a mounted spherically mounted retro-reflector without occlusion and at any angle of rotation upon the body. The universal sphere mount achieves tolerances, within 0.0005 inch of the centerline and of the height of a spherically mounted retro reflector placed therein.

21 Claims, 5 Drawing Sheets

UNIVERSAL SPHERE MOUNT

CROSS REFERENCE TO RELATED APPLICATION

This non-provisional patent application claims priority to the provisional patent application having Ser. No. 61/336,520, having filing date Jan. 22, 2010, this application is related to U.S. Pat. No. 7,110,194 commonly owned by the same assignee.

BACKGROUND OF THE INVENTION

The universal sphere mount relates generally to precision measuring systems that provide for critical detection of light and other radiation from a source, a laser powered tracking system among others, and more specifically to a spherically mounted retro-reflector three-point conical nest mount, having a negative acceptance angle at any rotation of a target upon the invention and the invention defines a target assembly that provides for area and location of the target to a tolerance within +/−0.0005 inch or less. The nest allows a target to rotate about an axis perpendicular to the plane of the nest.

Modern manufacturing technology, particularly that associated with the construction of large composite material structures, such as for aircraft parts machining and aircraft assembly, subjects the contours of components and tooling to accurate measurement and meticulous inspection for compliance with design models and specifications. One manner in which these structures are measured is with the aid of portable coordinate measuring machines such as laser trackers.

Laser trackers measure and inspect large components by illuminating one or more retro-reflecting targets mounted to the parts, tooling, or components in predetermined locations with a laser. The position of the laser tracker and of the positioning of the retro-reflector target is measured using the laser, and compared with design models or specifications, such as those stored on a computer.

Other examples of various measurement systems for reference are as follows. The Global Positioning System, or GPS, is used indoors as a method to precisely set various industrial devices and industrial equipment, including machinery and for close tolerance industrial surveying, as used in manufacturing and assembly operations. Laser projection systems emit a laser beam along a line that represents the position of an edge used in a step of manufacturing, such as the position of a composite lay up sheet.

For reference, retro-reflective photo targets have had countless design adaptations to enhance precision for the various settings and component features that are measured using close range industrial photogrammetry. These adaptations may include straight holes, threaded holes, surfaces, edges, slots and the like. The prior art frequently obtains tolerances as close as +/−0.0005 inch on the various targeting products.

Currently, most spherically mounted retro-reflectors receive incident light through an aperture, then reflect the light to the measuring system for a precise fix of the location of the spherically mounted retro-reflector. When the light source fires, it emits light which is then collected by a spherically mounted retro-reflector and returned for detection by the measuring system. The measuring system then determines the three-dimensional location of the spherically mounted retro-reflectors in the X, Y and Z axes.

To facilitate the use of laser trackers, retro-reflectors are centrally mounted in hollow steel spheres, commonly referred to as Spherically Mounted Retro-reflectors (SMR), which in turn are fitted to the target object in predetermined locations with the use of sphere mounts, such as is shown at in FIG. 1, along with previous designs of the Applicant. The hollow steel balls include a circular opening or aperture in an exterior surface, through which laser light enters the ball and is reflected back along an incident angle to the source by the internally mounted retro-reflector. Surrounding the circular opening or aperture may be a cylindrical hood, configured to reduce or eliminate unwanted glare and to protect the glass optical retro-reflector from breakage. Most sphere mounts are typically cylindrical or disc shaped, and includes a recessed conical nest in one surface which holds and locates the retro-reflector sphere, usually with the aid of a magnet. The opposite surface of the sphere mount is either flat, includes a base shank, or has other possible configurations, that allow for seating within a correspondingly sized bore, or other features, on the target object, permitting the sphere mount to be located at a known position on the target object. A sphere mount having a three-point conical nest, commonly referred to as a kinematic mount, may be utilized.

Conventional sphere mounts accommodate three standard sizes, such as 0.500 inch, 0.875 inch, and 1.500 inch' and have a hemispherical mounted range of illumination acceptance, generally limited by the mechanical interaction between the edge of the circular opening or aperture in the retro-reflector sphere and the upper surface of a sphere mount. A retro-reflector ball in a conventional sphere mount may rotate through a vertical arc of 180 degrees and may rotate 360 degrees about the central axis within the conical nest of the sphere mount.

In some applications, the laser tracker or illumination source, or the sphere mount itself, may not be disposed within the hemispherical mounted range of illumination acceptance defined by the upper surface of the sphere mount, but rather, slightly below the lower boundary. For these applications, it is known to employ sphere mounts having an axially perpendicular recess between the base of the conical nest and the circumferential perimeter. A retro-reflector ball placed in such a modified sphere mount may rotate through a vertical arc angle greater than 180 degrees when radially aligned with the perpendicular recess by seating the cylindrical hood within the recess, providing an extending illumination acceptance range.

Vertical arc angles of illumination acceptance from 0 degrees to 180 degrees are considered "positive" angles while vertical arc angles of acceptance greater than 180 degrees, that is, below the horizon of the sphere base, are considered "negative" angles. However, a portion of the circular opening or aperture to the ball mounted retro-reflector is occluded by the modified sphere mount, reducing the effective size of the circular opening or aperture and rendering measurement readings more difficult to obtain.

DESCRIPTION OF THE PRIOR ART

For nearly twenty years, the Applicant has produced various mounts for industrial surveying and coordinates metrology applications. The Applicant's prior patent, U.S. Pat. No. 7,110,194, describes a nest where the sphere of a spherically mounted retro-reflector rests in position and remains held in place by a magnet. The strength of the magnet holds the spherically mounted retro-reflector in its critical position upon three axes. The nest has a contact diameter, where the spherically mounted retro-reflector rests, of a particular larger size. The nest also utilizes a V shaped internal conical rim with three small locating pads with equi-angular spacing about the rim, effectively a three point nest. Below the nest, the mount has its largest diameter of approximately 1.60 inches, generally proximate the diameter of a spherically mounted retro-reflector. At this diameter, the mount partially surrounds a retro-reflector.

In the '194 patent, a negative notch allows a retro-reflector to rotate below a horizontal plane defined by the base of the mount, that is, generally downward. At all orientations, the retro-reflector maintains its proper line of sight with the measuring system. Further, the mount maintains the critical X, Y, Z coordinates of the spherically mounted retro-reflector within the tolerances of the measuring system.

However, the '194 patent provides its negative notch that also makes maintaining manufacturing tolerances more difficult. This difficulty comes from distortions of the mount, particularly the rim, under various production environment conditions. The lack of material in the notch allows the remainder of the rim to expand and contract more than a complete, or notch-less, rim. And for a spherically mounted retro-reflector to rotate below the horizontal plane, the spherically mounted retro-reflector must lie within only the negative notch and not outside of it. Though useful, a single negative notch limits spherically mounted retro-reflectors and other products that have a fixed position and cannot rotate to capture the line of sight or beam from the source in various measurement systems. For example, if the notch has an orientation opposite a desired direction when the sphere mount is fixed securely. Though useful for negative notch application, the '194 patent only allows a negative orientation at one angle of rotation upon the circumference of the mount, not any angle of rotation upon the circumference of the mount.

Also for many years, Leica Geosystems, of Norcross, Ga., has provided a reflector holder with shank and a 0.750 inch body, part 576066. This prior art holder includes a smaller locating contact diameter where the holder contacts a spherically mounted target placed thereon. This holder has a smaller body diameter than other prior art holders. Further, this holder has a more open conical nest than the prior art typically has. The Leica holder allows for spherically mounted targets to rotate somewhat below a horizontal plane, or negative rotation, without a negative notch as in the '194 patent of the Applicant. The Leica holder achieves negative rotation at any direction, or azimuth, around the holder.

However, the Leica holder has a 0.750 inch diameter body in comparison to a 1.5 inch diameter spherically mounted target commonly used in the metrology industry. The smaller footprint allows for placing the holder in tighter locations upon an object subject to measurement, however, the much smaller footprint of the present invention in comparison to the much larger spherical target of the prior art, creates a less stable condition of the target mount upon the structure, or object, being measured. The Leica holder also has an open and flatter conical nest without any reliefs. During usage, the flat surfaces of a holder collect items from their nearby environment. The Leica holder collects dust, shavings, and other foreign material that lands within the conical nest. The foreign material accumulates in the flat portion and somewhat along the bevel of the conical nest. With sufficient foreign material accumulated, specs of foreign material insert between a spherically mounted target and the conical nest. The foreign material leads to improper and inaccurate seating of the spherically mounted target. The inaccurate seating then propagates error in measurements taken from a spherically mounted target upon the Leica holder.

Accordingly, the metrology industry has need for a modified sphere mount design which will provide a maximum illumination acceptance range for a spherically mounted retro-reflector greater than 180 degrees and at any rotation up to 360 degrees, which is stable and smaller than prior art mounts, and which will not occlude the retro-reflective elements and illumination source. The present invention uses precise steps in manufacturing to produce a sphere mount suitable for the selected range of rotations that achieves positional tolerances of +/−0.0005 inch along its centerline, for concentricity, and for height offset. This invention allows negative rotation of the spherically mounted retro-reflector at any amount of rotation upon the mount with a smaller footprint while still representing X, Y, Z values within a tolerance of +/−0.0005.

SUMMARY OF THE INVENTION

The present invention provides a sphere retro-reflector conical nest mount having a base, a body upon the base where the body steps inwardly in diameter, alternatively a shank depending from the base, and a precisely sized and located nest in the body that receives a spherically mounted retro-reflector target. IN one embodiment stepping inwardly in diameter, the body has significantly less diameter than the base so that in combination with the nest the spherically mounted retro-reflector achieves an orientation below a horizontal plane at any angle of rotation around the circumference of the mount. This stepped embodiment has a mount with a large enough locating foot print that provides proper secure support of a much larger spherical target that is installed into the mount. The universal sphere mount has a configuration to receive a spherically mounted retro-reflector in a centrally disposed conical nest centered in the body, and to position it with a high degree of precision over the central axis of the shank. The nest has the form of at least three oblique contact points, equally spaced around the body, and that permit a maximum negative acceptance angle for incident light to a spherically mounted retro-reflector without occlusion and at any angle of rotation upon the body.

The present invention has a larger footprint, typically one inch in diameter, though other diameters are foreseen. The footprint allows for an alternate embodiment that has a rigid and stiff shank beneath the holder. The footprint has sufficient size to provide stable support for a 1.5 inch spherically mounted target in contrast to the 1.6 inch diameter of the Applicant's '194 patent. The holder has a stepped upper portion, or body, with a diameter of approximately 0.75 inch while the remainder of the mount, primarily the base, has a one inch diameter. The step inward of diameter from the base to the body allows for negative rotation of a spherically mounted retro reflector below a horizontal plane, to the greatest degree while still maintaining stability, at any angle around the body. The diameter of the body and its step inward from the base provides for a flatter included angle between a spherically mounted retro reflector and the body, thus allowing for more negative roll of the retro-reflector in comparison to the prior art. The body also has the three point nest that provides for a more confident location of a spherically mounted target placed on the nest. Unlike conical nests of the prior art, the three point nest of the present invention reduces the presence of foreign material in the contact areas of the nest and the spherically mounted target.

This invention provides a means for achieving very close tolerances at maximum negative rotations and at any rotation, within +/−0.0005 inch, in the assembly and usage of a retro-reflective laser tracking system. The current invention has an alternate embodiment designed to provide a precisely machined mount with a shank that fits into a precisely machined socket upon an object subject to measurement.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is, therefore, the principle object of this invention is to provide an improvement in the technology of spherically mounted retro-reflector holders to allow for negative rotation in any direction and within a tolerance of +/−0.0005 inch.

Another object of this invention is to provide for a mount that maintains values and tolerances comparable to other critically toleranced laser tracker products.

Another object of this invention is to provide for a mount that has a smaller footprint but still provides stability for a spherically mounted target placed thereon.

Another object of this invention is to provide for a mount that allows for negative rotation of a spherically mounted target but without a negative notch.

Another object of this invention is to provide for a mount that allows for positioning a spherically mounted target at any angle from 0 to 360 degrees around a horizontal plane while in negative rotation below said plane.

Another object of this invention is to provide for a mount that has a three point nest with relief for exit of foreign material from the nest, the mount having confidence of a critical spherically mounted target location.

Another object of this invention is to provide for a mount that has less weight than the prior art.

Another object of this invention is to provide for a mount that utilizes less material during manufacturing and in the finished mount.

Another object of this invention is to provide for a mount that has less risk of distortion to the nest by omitting a negative notch.

Another object of this invention is to provide for a mount that has a low cost of manufacturing so that the manufacturers and government agencies can readily purchase the system through existing procurement channels and sales outlets.

These and other objects may become more apparent to those skilled in the art upon review of the summary of the invention as provided herein, and upon undertaking a study of the description of its preferred embodiment, in view of the drawings.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
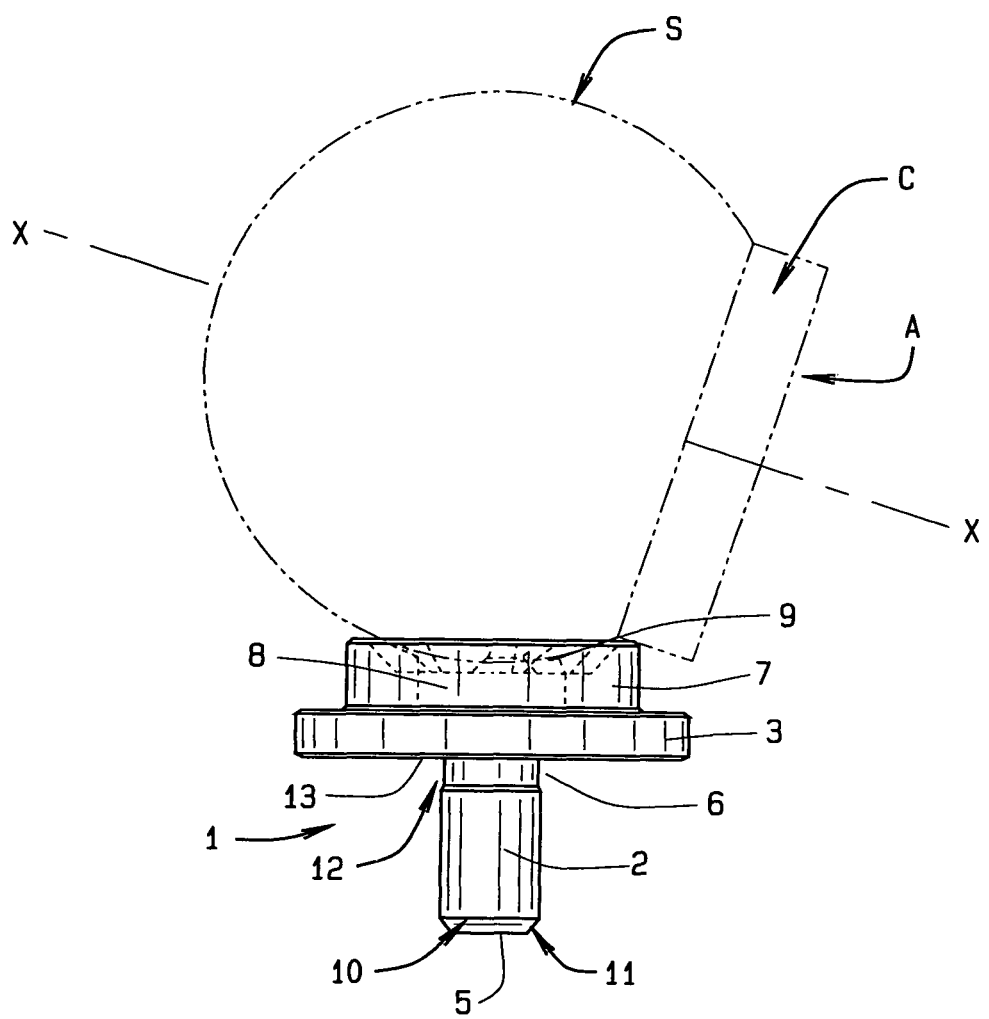
FIG. 1 shows a side view of a spherically mounted retro-reflector target placed upon the present invention.

In referring to the drawings, FIG. 1 shows a spherically mounted retro-reflector target S placed upon a mount 1 of the present invention. The target S has an aperture A within a collar C. The collar has a diameter generally less than that of the target S and the aperture allows passage of incident radiation, primarily light, into the target. The collar C is generally defines a plane perpendicular to a radius of the target S. The target S has a highly reflective interior that reflects the incident radiation outwardly through the aperture upon a precise radius through the geometric center of the target. During usage, the mount 1 is deployed upon an object subject to measurement, not shown, and a radiation source, usually a laser, that emits a beam. Radiation from the source enters the aperture of the collar and reflects from the interior of the target S and exits the aperture A upon a radius from the geometric center to a measuring unit, not shown, located away from the target. The measuring unit then determines the location of the target in a three axis coordinate system so that the object subject to measurement has a known location to within 0.0005 of an inch, about less than half the thickness of a human hair.

Beneath the target, FIG. 1 shows the present invention of a mount 1. The mount has a generally cylindrical shank 2 that extends outwardly and downwardly, as shown, from a base 3. The base has a bottom surface 3a from which the shank extends as later shown in FIG. 5. The shank has a generally round cylindrical shape with a diameter and a first end 5 and an opposite second end 6 proximate the base. The first end generally inserts into a socket, not shown, in an object subject to measurement. Then the base has a generally round shape and a thickness, as at 4, and its diameter that greatly exceeds the diameter of the shank 2. Opposite the shank, the base has a body 7 of lesser diameter, approximately 0.75 inches extending away from the base. The body has a generally cylindrical shape and a thickness. The body then has included therein a magnet as at 8, shown in phantom, see also FIGS. 2, 4, 6, 8, generally cylindrical in shape with a height, or thickness, approximately one half the thickness of the body. The magnet has sufficient strength to attract and retain a target S of typical weight yet permit manual adjustment of the target upon the body. The magnet and target have a minimum gap between them. Above the magnet 8 and proximate to a target S placed upon the body, the body has a centered nest 9. The nest is generally a depression in the body opposite the base. The nest has precise geometry to receive the spherically mounted surface of a target. The nest has an effective depth that cooperates with the radius of the target, the radius of the body, the diameter and the height of the collar. The effective depth of the nest ensures that incident or reflected light entering the aperture A perpendicular to the plane of the aperture, i.e. parallel to a central axis X-X through the collar C as in a cylindrical or perpendicular field-of-view, and at the maximum negative acceptance angle, or MNA, for the present invention, is not occluded by the body 7 and the base 3 at any horizontal angle of rotation around the body.

As further explanation, the maximum negative acceptance angle, or MNA, for the present invention 1 and spherically mounted retro-reflector S is delimited by the size of the aperture A and the parameters of the three point nest 9. Specifically, the ball mounted retro-reflector S can only be rotated within the nest 9 to a negative acceptance angle at which the circumferential edge of the collar C contacts the body 7 upon its perimeter opposite the base. Further rotation of the target S downwardly is prevented when the collar C contacts the body. As shown, central axis X-X has a negative angle below a horizon through the center of the target S established perpendicular to a central axis of the shank 2. The present invention allows orientation of the central axis X-X at any angle of rotation around the circumference of the base, that is, from 0 to 360 degrees.

The shank has additional features that limit the affects of foreign material collected upon the mount 1 during installation and usage. The shank 2 has its first end 5 with a perimeter and here shown having a slight bevel inwardly, as at 10. The bevel has a perimeter slightly less than the perimeter of the first end with an angled surface, as at 11, extending around the first end as shown. Opposite the first end, the shank has its second end 6 that has a slight narrowing in diameter for a short distance away from the base defining a groove 12. The groove then has a slight bevel to return the shank to its diameter along the main portion of the shank between the first and second ends. Where the shank merges with the base, the second end has the groove 12 adjacent to the base. Outwardly from the groove, the base has a ring 13 recessed into the base. The integral ring has an inner diameter approximately that of the diameter of the groove and an outer radius slightly more than the diameter of the shank. The ring has a depth slightly more than the depth of the groove. The groove and ring—proximate the merge of the shank to the base—collect foreign material, dust shavings, and debris collected by the shank and the base from an object to be measured and the nearby environment during installation and usage. The groove and ring cooperate to minimize the adverse effects of foreign material beneath the invention. The groove and ring also remove any radius of material thus allowing complete contact of the base to a surface when mounting the shank into a hole.

Figure 2:
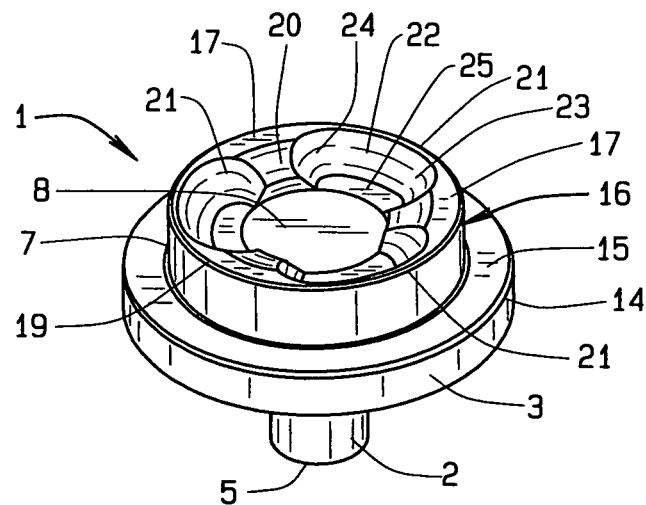
FIG. 2 shows a perspective view of the invention.

Removing the target S, FIG. 2 shows the universal sphere mount in a perspective view showing the interior of the body. The mount has the shank 2 with its first end 5 here shown downwardly. The shank merges to the base as described above and has a groove 12 at its second end 6 that cooperates with the ring 13 to minimize the effects of accumulated foreign material beneath the mount when installed, and to remove any radius of material that interferes. The base 3 is generally round with a thickness as at 14 that defines a cylindrical shape for the base. The base has an outer diameter of approximately 1.0 to 1.6 inch. Opposite the shank, the base has a bench 15 generally annular in shape and perpendicular to the shank. Upon the bench, the mount has the body 7 of lesser diameter than the base, approximately 0.75 inch. The body extends upwardly from the bench 15 at a step 16 that defines the thickness of the body as generally more than the thickness 14 of the base. The body has a top surface 17 generally parallel to a plane defined by the bench 15.

Recessed below the top surface 17, the body has a nest defined by three contact points 20 spaced at equal angles around the body, approximately 120 degrees. Each contact point angles downwardly towards the center of the body. The contact point has a radius of curvature identical to the outer radius of the target S. As shown in FIG. 1, a target S placed upon the mount 1 rests upon the three contact points 20. Each contact point angles downwardly from the top surface 17 and narrows. Each contact point then turns downwardly at a distance from the center of the body identical to the radius of the magnet 8.

The nest has a certain included angle so that a target placed upon the contact point achieves its maximum negative acceptance angle as it holds the target securely. The included angle is measured as the angle between lines from two contact points along the plane of each contact point through the central axis of the mount. When the two lines attain an included angle of 180 degrees, a nest is generally flat and unable to hold a target. When the two lines attain an included angle of 0 degrees, a nest is generally closed and essentially has no contact points. The present invention has an included angle of the nest, that is, between two contact points, within those two previous angular limits.

Between each pair of adjacent contact points 20, the nest has a relief area 21 with three relief areas spaced at equal angles around the body, approximately 120 degree apart from each other. Each relief area is generally a depression into the body having a generally elliptical shape, tapering as it proceeds downwardly into the body. The relief area has an outer wing 22 proximate to the perimeter of the body along the wider portion of the elliptical shape. The outer wing has the thinnest thickness of the relief area. Clockwise from the outer wing, the relief area has a right wing 23 that curves sharply around the narrow end of the elliptical shape. The right wing defines an edge of an adjacent contact point. Opposite the right wing, or counterclockwise from the outer wing, the relief area has a left wing 24. The left wing also curves sharply around the opposite narrow end of the elliptical shape. The left wing defines an edge of another adjacent contact point. Downwardly from the top 17, the outer wing, right wing, and left wing taper towards a foot 25. The foot is generally flat and parallel to the plane of the top. The foot has an elliptical shape smaller in length and width than the shape of the relief area at the top. Towards the center of the mount 1, the foot has a curved edge 26 that abuts the magnet 8. The relief areas and the contact points alternate positions around the circumference of the body so that a target S receives balanced support while intercepting foreign material from any direction of horizontal rotation.

Figure 3:
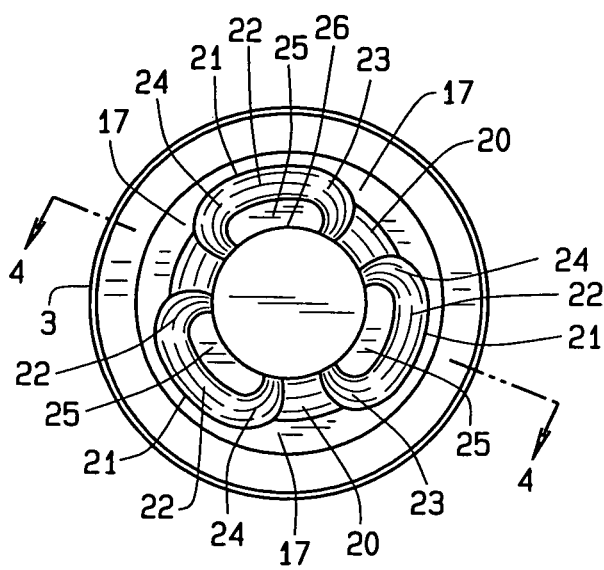
FIG. 3 describes a top view of the invention.

Viewing the mount from above, FIG. 3 shows the magnet 8 being round and centered in the mount 1. The magnet has sufficient strength to attract a target S of typical weight and maintain a proper gap, but still permits manual adjustment of the target as needed. The magnet sits recessed slightly below the contact points 20 so that magnet has a tangential approach to the surface of a target. The magnet has a close enough location to the target so that the attractive force remains strong between them. Outwardly from the magnet, has three equally spaced relief areas 21 generally open and elliptical. The relief areas taper outwardly from their feet 25 at the elevation of the magnet upwardly to the adjacent top 17. Each relief area has an outer wing 22, a left wing 24, and a right wing 23. The wings taper outwardly from the foot towards the top. The left wing and the opposite right wing have sharply curved shapes as viewed from above while the outer wing has a more flat curve. The outer wing spans from the left wing to the right wing, defining the relief area as a generally elliptical shape. The outer wing has a maximum radius of approximately 0.35 inches. Each relief area abuts a contact point 20 on the left wing and the ring wing for approximately half the length of the left wing and the right wing.

Each contact point 20 increases in thickness from its minimum thickness proximate the magnet 8 to the thickness of the top 17, generally the thickness of the body, that is, similar to the height of the step 16. Each contact point also widens from its narrow width proximate the magnet to its maximum width proximate the top but partially along the length of an adjacent wing. The contact points alternate with the relief areas for even placement around the body. The relief areas, particularly the outer wings, extend closer to the perimeter of the body than the contact points. The relief areas and the contact points terminate at the top 17.

The top is generally planar and parallel to the surface of the magnet. Outwardly from the contact points and the relief areas, the top attains the round shape of the body.

Figure 4:
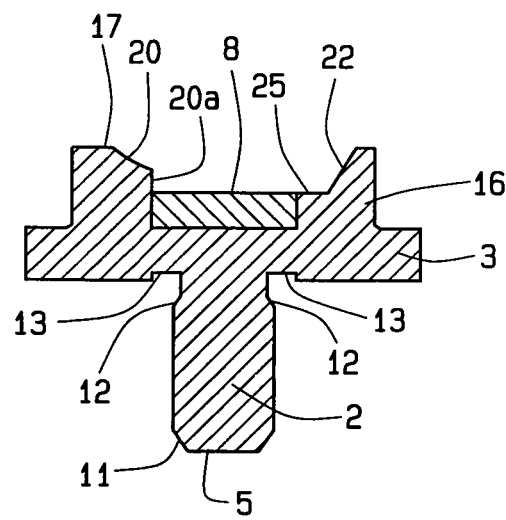
FIG. 4 illustrates a sectional view of the invention.

FIG. 4 shows the nest 9 upon the body 7 of the base 3 in further detail along a section view. The contact point 20 descends from the top along a radial curve similar to the radius of a target S. During the descent, the contact point decreases in thickness from its maximum at the top to its minimum proximate the magnet. The contact point steps downwardly, as at 20a, to the surface of the magnet. The magnet remains generally centered upon the longitudinal axis of the mount 1. Opposite the contact point and outward from the magnet a clearance, area 21, or relief area, begins with its foot 25 generally coplanar with the surface of the magnet as shown. The clearance area continues upwardly and outwardly upon the bevel of the outer wing 22. The outer wing extends upwardly to the plane defined by the top 17.

Upon the left and the right, the body extends downwardly from the top 17 along the step 16 to the base 3. The base 3 has a greater diameter than the body 7, generally 1.0 inch as opposed to 0.75 inch respectively. The base has its thickness 4. Opposite the body 7, the base has its shank 2. The shank extends from the base at the second end 6. The base though has its ring 13 around the second end 6 and extending as a depression into the groove as previously described. The second end has a slight narrowing in the diameter of the shank, as at 12. Beneath the neck area as at 12, the shank has its maximum diameter. Opposite the second end 6, the shank has its first end 5 with a beveled edge as at 10.

Figure 5:
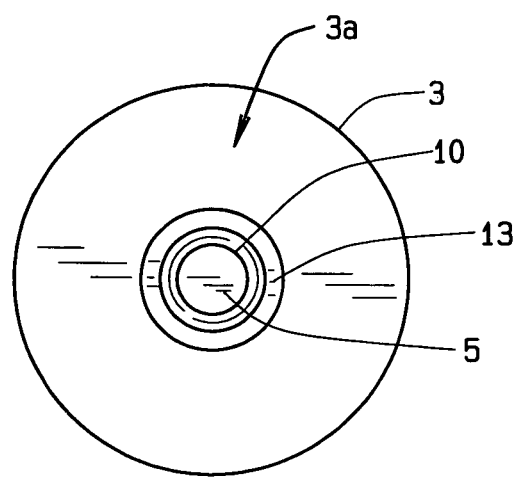
FIG. 5 shows a bottom view of the invention.

The first end 5 appears in the center of FIG. 5 as a bottom view of the mount. The first end 5 is generally round and of a narrower diameter than the remainder of the shank 2. The first end expands outwardly along the beveled edge 10 to the diameter of the shank 2. The shank continues into the background of this figure towards the base 3. Where the shank meets the base, the base has its ring 13 extending outwardly from the shank and slightly into the thickness of the base. The bevel 10 aids the shank during insertion of the mount into a socket upon an object subject to measurement. The ring 13 accommodates foreign material and the edge condition of a socket when the base rests upon an object for measurement and also removes any interfering radius.

Figure 6:
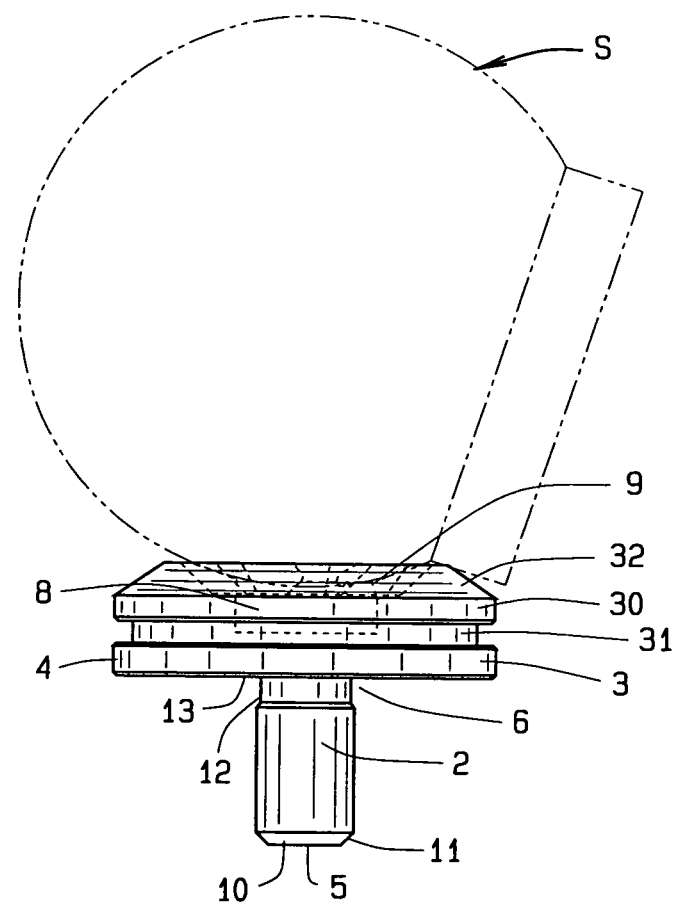
FIG. 6 shows a side view of a target placed upon another embodiment of the present invention.

Beneath a target S, here shown spherically mounted, FIG. 6 shows an alternate embodiment of the present invention of a mount 1. The mount has its cylindrical shank 2 extending outwardly and downwardly from the base 3. The base also has its bottom surface 3a that abuts an object subject to measurement and from which the shank extends. The shank usually has a round cylindrical shape with a diameter and a first end 5 and an opposite second end 6 proximate the base. The first end generally inserts into a socket, not shown, in an object subject to measurement. Then the base has a generally round shape and a thickness, as at 4, and its diameter that greatly exceeds the diameter of the shank 2, approximately 1.0 inch. Opposite the shank, the base has a round body 30 stepped inwardly from the base as at a groove 31. The groove has a slightly lesser diameter than the base and a depth of approximately 0.05 inches. The body has a generally round cylindrical shape above the groove 31 and an inward bevel as at 32 opposite the shank. The bevel may also be described as a frusto conical shape truncated by the top 17. The body 30 then has its magnet 8 placed therein, shown in phantom, generally cylindrical in shape with a height, or thickness, approximately one half the thickness of the body and generally positioned above the base 3 approximately half way through the groove and extending to a plane defining the beginning of the bevel 32. The magnet has sufficient strength to attract and retain a target S of typical weight with proper air gap between the target and the magnet yet permit manual adjustment of the target upon the body. Above the magnet 8 and proximate to a target S placed upon the body, the body has the centered nest 9, generally a depression in the body opposite the base. The nest has its precise geometry to receive the surface of a spherically mounted target S. The nest has an effective depth that cooperates with the radius of the target, the radius of the body, and the height and angle of the bevel. The effective depth of the nest ensures that incident or reflected light entering the target and at the maximum negative acceptance angle, or MNA, for the present invention, is not occluded by the body 30, the base 3, and the mount 1 at any horizontal angle of rotation around the body. The present invention allows for a negative angle of the target at any rotation of the target, that is, from 0 to 360 degrees, upon the body.

As before, the shank has additional features that limit the affects of foreign material collected upon the mount 1 during installation and usage. The shank 2 has its first end 5 with a perimeter and a slight bevel inwardly, as at 10. The bevel has a perimeter slightly less than the perimeter of the first end with an angled surface, as at 11, extending around the first end as shown. Opposite the first end, the shank has its second end 6, slightly narrowed in diameter for a short distance away from the base defining a groove 12. The groove then has a slight bevel to return the shank to its diameter along the main portion of the shank between the first and second ends. Where the shank merges with the base, the second end has the groove 12 adjacent to the base. Outwardly from the groove, the base has a ring 13 recessed into the base. The ring has an inner diameter approximately that of the diameter of the groove and an outer radius slightly more than the diameter of the shank. The ring has a depth slightly more than the depth of the groove. The groove 12 and the ring 13 appear in more detail as previously shown and described in FIGS. 4, 5. The groove and ring near the merging of the shank to the base accommodate foreign material, such as dust shavings and debris, collected by the shank and the base from an object to be measured during installation and usage. The groove and ring also remove any interfering radius.

Figure 7:
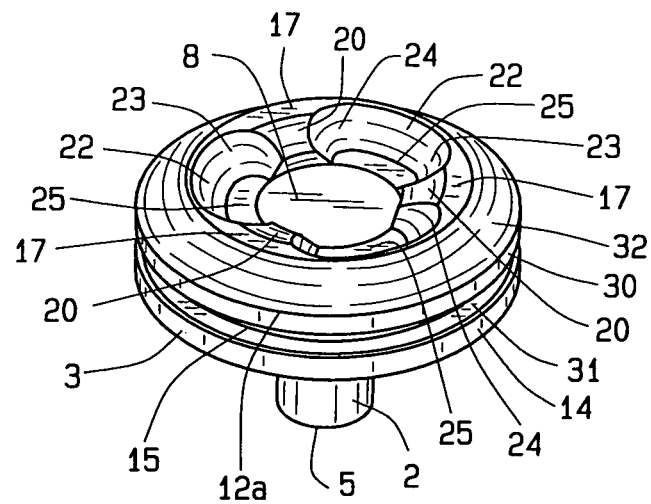
FIG. 7 shows a perspective view of the other embodiment of the invention; and, FIG. 8 describes a top view of the other embodiment of the invention.

Removing the target S, FIG. 7 shows a perspective view of the alternate embodiment of the invention having the interior of the body visible. The mount has the shank 2 with its downward first end 5. The shank merges to the base and has a groove 12 at its second end 6 that cooperates with the ring 13 as previously described. The base 3 is generally round with a thickness as at 14 that defines a cylindrical shape for the base. The base has an outer diameter of approximately 1.0 to 1.6 inch. Opposite the shank, the base has its bench 15 generally annular in shape and perpendicular to the shank. The bench forms one side of groove 31 denoting the body 30 above the base. The groove 31 has a lesser diameter than the base and a depth generally proportional to the thickness 14 of the base. The body extends upwardly from the groove and steps outwardly to define a base denoting the widest portion of the bevel 32. The base has a diameter of 1.0 inch. Above the bevel, that is, opposite the base, the body 30 has a top surface 17 generally parallel to a plane defined by the base 3.

Recessed below the top surface 17, the body has its nest 9 that includes three contact points 20 spaced at equal angles around the body, approximately 120 degrees and generally within the bevel. Each contact point angles downwardly towards the center of the body. The contact point has a radius of curvature identical to the outer radius of the target S. As shown previously in FIGS. 1, 6, a target S placed upon the mount 1 rests smoothly upon the three contact points 20 where the curvature of the contact points matches the radius of the target S. Each contact point angles downwardly from the top surface 17 and narrows both in width and depth towards the magnet, or the center of the body. Each contact point then turns downwardly at a distance from the center of the body identical to the radius of the magnet 8.

The nest has a certain included angle so that a target placed upon the contact point achieves its maximum negative acceptance angle while still holding the target assembly. The included angle is measured as the angle between lines from two contact points along the plane of each contact point through the central axis of the mount. When the two lines attain an included angle of 180 degrees, a nest is generally flat and unable to hold a target. When the two lines attain an included angle of 0 degrees, a nest is essentially has no contact points. The present invention has an included angle of the nest, that is, between two contact points between those two previous angular limits.

Between each pair of adjacent contact points 20, the nest also has a relief area 21 with three relief areas spaced at equal angles around the body, approximately 120 degrees apart from each other. Each relief area is a depression into the body having a generally elliptical shape, tapering as it proceeds downwardly into the body. The relief area has an outer wing 22 proximate to the perimeter of the body along the wider portion of the elliptical shape. The outer wing has the thinnest thickness of the relief area. Clockwise from the outer wing, the relief area has a right wing 23 that curves sharply around the narrow end of the elliptical shape. The right wing defines an edge of an adjacent contact point. Opposite the right wing, or counterclockwise from the outer wing, the relief area has a left wing 24. The left wing also curves sharply around the opposite narrow end of the elliptical shape. The left wing defines an edge of another adjacent contact point. Downwardly from the top 17, the outer wing, right wing, and left wing taper towards a foot 25. The foot is generally flat and parallel to the place of the top. The foot has an elliptical shape smaller in length and width than the shape of the relief area at the top. Towards the center of the mount 1, the foot has a curved edge 26 that abuts the magnet 8. The relief areas and the contact points alternate positions around the circumference of the body so that a target S receives balanced support while intercepting foreign material from any direction of horizontal rotation.

Figure 8:
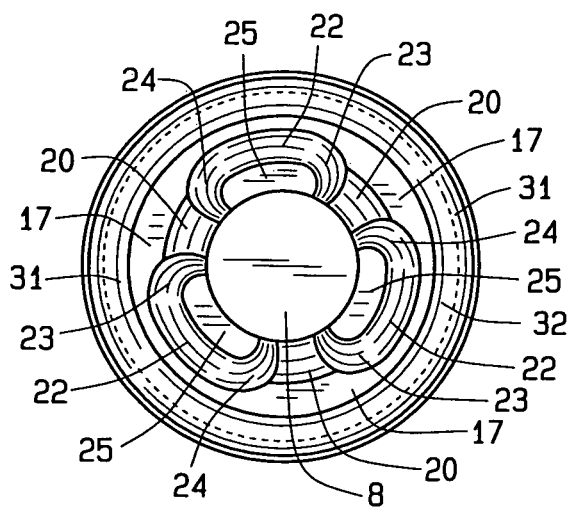

Viewing the mount from above, FIG. 8 shows the magnet 8 being round and centered in the mount 1. As before, the magnet has enough strength to grasp a target S of typical weight and with a proper air gap between the target and the magnet but still permit manual adjustment of the target during usage. The magnet sits recessed slightly below the contact points 20 so that magnet has a tangential approach to the surface of a target placed in the center of the nest 9. The magnet has a close enough location to the target so that the attractive force remains strong between them. Outwardly from the magnet, the body has three equally spaced relief areas 21 generally open and elliptical. The relief areas taper outwardly from their feet 25 at the elevation of the magnet upwardly to the adjacent top 17. The top has a diameter across the body of approximately 0.75 inches. Each relief area has an outer wing 22, a left wing 24, and a right wing 23. The wings taper outwardly from the foot towards the top. The left wing and the opposite right wing have sharply curved shapes as viewed from above while the outer wing has a more flat curve. The outer wing has a maximum radius of approximately 0.35 inches. The outer wing spans from the left wing to the right wing, defining the relief area as a generally elliptical shape. Each relief area abuts a contact point 20 on the left wing and the ring wing for approximately half the length of the left wing and the right wing.

Each contact point 20 increases in thickness from its minimum thickness proximate the magnet 8 to the thickness of the top 17, generally the height of the bevel 32 above its own base which is also greater than the depth of the groove. Each contact point also widens from its narrow width proximate the magnet to its maximum width proximate the top but partially along the length of an adjacent wing. The contact points alternate with the relief areas for even placement around the body. The relief areas, particularly the outer wings, extend closer to the perimeter of the body than the contact points. The relief areas and the contact points terminate at the top 17.

The top is generally-planar and parallel to the surface of the magnet. Outwardly form the contact points and the relief areas; the top attains the round shape of the body. The preceding description has referred to a mount with a shank. Those of ordinary skill in the art will recognize that the universal sphere mount may be constructed without the shank as an alternate embodiment. Without a shank, the universal sphere mount may secure to an object undergoing measurement by adhesives, glues, cohesives, welding, swaging, and a threading to the circumference of the base. With a shank, the present invention also secures to an object using threading upon the shank.

In view of the above, it will be seen that the several objects of the invention are achieved and other advantageous results are obtained. Variations or modifications to the subject matter of this development may occur to those skilled in the art upon review of the invention as described herein. Such variations, if within the spirit of this development, are intended to be encompassed within the scope of the invention as explained. The description of the preferred embodiment and as shown in the drawings, are set forth for illustrative purposes only to show the principle of this universal sphere mount that allows for negative vertical rotation of a spherically mounted retro-reflector at any angle of horizontal rotation while minimizing the effects of any foreign debris collected upon the mount.

I claim:

1. A mount for a spherically mounted retro-reflector having a radius and an apex of the spherically mounted retro-reflector aligned with the absolute center of the spherically mounted retro-reflector and an aperture in surface of the spherically mounted retro-reflector, said mount configured to receive the spherically mounted retro-reflector, said mount comprising:

a base, generally round having a bottom and an outer diameter;

a body centered upon said base and generally opposite said bottom, said body having a top generally opposite said base and a circumference, said top having a diameter less than said base;

a conical nest formed in said body opposite said base and within said top, said nest receiving the spherically mounted retro-reflector;

wherein said body locates beneath the spherically mounted retro-reflector and has a configuration to permit the spherically mounted retro-reflector to orient upon said conical nest and said body to a maximum negative acceptance angle delimited by said conical nest and the spherically mounted retro-reflector;

wherein said body has a further configuration of the spherically mounted retro-reflector attaining its maximum negative acceptance angle at any angle of rotation around the circumference of said body;

wherein said mount has a further configuration that permits unimpeded light acceptance to the spherically mounted retro-reflector at any negative angle up to and including its maximum negative acceptance angle; and, said mount positioning the spherically mounted retro-reflector within 0.0005 inch of a centerline of said mount and within 0.0005 inch vertically.

2. The mount of claim 1 further comprising:

said conical nest having at least three contact points equally spaced about the circumference of said body, said contact points defining an included angle of said conical nest.

3. The mount of claim 2 further comprising:

said conical nest having at least three clearance areas alternating with said contact points about the circumference of said body wherein each of said clearance areas extend outwardly and below each of said contact points.

4. The mount of claim 1 further comprising:

said bottom having a centered shank generally perpendicular to said bottom, said shank having a generally cylindrical form, a first end and an opposite second end, said second end locating proximate said base, said second end having a groove upon its circumference;

said base having a ring recessed therein opposite said body and outwardly of said groove of said second end of said bottom; and, wherein said ring in said base and said groove in said bottom cooperate to minimize the effects of foreign matter during usage of said mount and to remove an interfering radius.

5. The mount of claim 1 further comprising:

said body extending upwardly from said base and having a lesser diameter than said base forming a groove parallel to a plane defined by said base, said body having a diameter similar to that of said base above said groove, then said body having a beveled surface upon its circumference extending upwardly and inwardly to said top; and, said beveled surface cooperating with said nest to allow the spherically mounted retro reflector to reach its maximum negative acceptance angle at any rotation upon the circumference of said body.

6. The mount of claim 5 further comprising:

said conical nest having at least three contact points equally spaced about the circumference of said body, said contact points defining an included angle of said conical nest and at least three clearance areas alternating with said contact points about the circumference of said body wherein each of said clearance areas extend outwardly and below each of said contact points.

7. The mount of claim 1 further comprising:

said body having a generally cylindrical shape centered upright upon said base and opposite said bottom and a diameter less than the diameter of said base and less than the radius of the spherically mounted retro reflector; and, said body having an inward step from said base forming a bench opposite said bottom, said body cooperating with said nest to allow the spherically mounted retro reflector to reach its maximum negative acceptance angle at any rotation upon the circumference of said body.

8. The mount of claim 7 further comprising:

said conical nest having three contact points equally spaced about the circumference of said body, said contact points defining an included angle of said conical nest and three clearance areas alternating with said contact points about the circumference of said body wherein each of said clearance areas extend outwardly and below each of said contact points.

9. The mount of claim 1 wherein said mount provides a location of the spherically mounted retro-reflector to within 0.0005 inch.

10. A mount for a spherically mounted retro-reflector having a radius and an apex of the spherically mounted retro-reflector aligned with the absolute center of the spherically mounted retro-reflector and an aperture in surface of the spherically mounted retro-reflector, said mount configured to receive the spherically mounted retro-reflector, said mount comprising:

a conical nest receiving the spherically mounted retro-reflector;

a body beneath said nest, said body having a top surrounding said nest and an outer diameter, said top having a diameter less than said outer diameter;

a base beneath said body, generally round having a bottom, and an outer diameter, said base, said body, and said nest being coaxial;

wherein said body locates beneath the spherically mounted retro-reflector and has a configuration to permit the spherically mounted retro-reflector to orient upon said conical nest and said body to a maximum negative acceptance angle delimited by said conical nest and the spherically mounted retro-reflector;

wherein said body has a further configuration of the spherically mounted retro-reflector attaining its maximum negative acceptance angle at any angle of rotation around the circumference of said body;

wherein said mount has a further configuration that permits unimpeded light acceptance to the spherically mounted retro-reflector at any negative angle up to and including its maximum negative acceptance angle; and, said mount positioning the spherically mounted retro-reflector within 0.0005 inch of a centerline of said mount and within 0.0005 inch vertically.

11. The mount of claim 10 further comprising:

said conical nest having at least three equally spaced contact points about the circumference of said body, said contact points defining an included angle of said conical nest.

12. The mount of claim 11 further comprising:

said conical nest having at least three clearance areas alternating with said contact points about the circumference of said body wherein each of said clearance areas extend outwardly and below each of said contact points.

13. The mount of claim 10 further comprising:

said bottom having a centered perpendicular shank, said shank having a cylindrical form, a first end and an opposite second end, said second end locating proximate said base, said second end having a groove upon its circumference;

said base having a recessed ring opposite said body and outwardly of said groove of said second end; and, wherein said ring and said groove minimize adverse effects of material collected beneath said mount during usage and to remove an interfering radius.

14. The mount of claim 10 further comprising:

said body extending upwardly from said base and having a lesser diameter than said base forming a groove parallel to said base, said body having a diameter similar to that of said base above said groove, then said body having a beveled surface upon its circumference extending upwardly and inwardly to said top; and, said beveled surface cooperating with said nest wherein said spherically mounted retro-reflector reaches its maximum negative acceptance angle at any rotation upon the circumference of said body.

15. The mount of claim 14 further comprising:

said conical nest having at least three equally spaced contact points, said contact points defining an included angle of said conical nest and at least three clearance areas alternating with said contact points about the circumference of said body wherein each of said clearance areas extend outwardly and below each of said contact points.

16. The mount of claim 10 further comprising:

said body having a generally cylindrical shape centered upright upon said base and opposite said bottom and a diameter less than the diameter of said base and less than the radius of the spherically mounted retro reflector; and, said body having a step inward from said base forming a bench opposite said bottom, said body cooperating with said nest wherein the spherically mounted retro-reflector reaches its maximum negative acceptance angle at any rotation upon the circumference of said body.

17. The mount of claim 16 further comprising:

said conical nest having at least three equally spaced contact points and at least three clearance areas alternating with said contact points about the circumference of said body; said contact points defining an included angle of said conical nest about the circumference of said body and each of said clearance areas extending outwardly and below each of said contact points.

18. The mount of claim 10 wherein said mount provides a location of the spherically mounted retro-reflector to within 0.0005 inch and wherein said mount allows rotation of the spherically mounted retro-reflector from 0° to 360° about a central axis of said mount.

19. A mount for a spherically mounted retro-reflector having a radius and an apex of the spherically mounted retro-reflector aligned with the absolute center of the spherically mounted retro-reflector and an aperture in surface of the spherically mounted retro-reflector, said mount configured to receive the spherically mounted retro-reflector, said mount comprising:

a base generally round and having a bottom surface and an outer diameter;

a body centered upon said base and generally opposite said bottom, said body having a top generally opposite said base and a circumference, said top having a diameter less than said base;

a conical nest formed in said body opposite said base and within said top, said nest receiving the spherically mounted retro-reflector;

said conical nest having at least three equally spaced contact points and at least three clearance areas alternating with said contact points about the circumference of said body, said contact points defining an included angle of said conical nest about the circumference of said body and each of said clearance areas extending outwardly and below each of said contact points;

said body extending upwardly from said base and having a lesser diameter than said base forming a groove parallel to said base, said body having a diameter similar to that of said base above said groove, then said body having a beveled surface upon its circumference extending upwardly and inwardly to said top;

wherein said body locates beneath the spherically mounted retro-reflector and has a configuration to permit the spherically mounted retro-reflector to orient upon said conical nest and said body to a maximum negative acceptance angle delimited by said conical nest and the spherically mounted retro-reflector;

said beveled surface cooperating with said nest wherein said spherically mounted retro-reflector reaches its maximum negative acceptance angle at any rotation upon the circumference of said body;

wherein said mount has a further configuration that permits unimpeded light acceptance to the spherically mounted retro-reflector at any negative angle including its maximum negative acceptance angle; and, said mount positioning the spherically mounted retro-reflector within 0.0005 inch of a centerline of said mount and within 0.0005 inch vertically.

20. The mount of claim 19 further comprising:

said bottom having a centered perpendicular shank, said shank having a cylindrical form, a first end and an opposite second end, said second end locating proximate said base, said second end having a groove upon its circumference;

said base having a recessed ring opposite said body and outwardly of said groove of said second end; and, wherein said ring and said groove minimize adverse effects of material collected beneath said mount during usage and to remove an interfering radius;

wherein said mount allows rotation of the spherically mounted retro-reflector from 0° to 360° about a central axis of said mount.

21. The mount of claim 1 wherein said mount allows rotation of the spherically mounted retro-reflector from 0° to 360° about a central axis of said mount.

\* \* \* \* \*